GERALD W. MEISENHOLDER
HOWARD C. VIVIAN
JAMES D. ACORD
LOUIS F. SCHMIDT
INVENTORS

Sept. 7, 1965  HUGH L. DRYDEN  3,205,362
DEPUTY ADMINISTRATOR OF THE NATIONAL
AERONAUTICS AND SPACE ADMINISTRATION
PHOTOSENSITIVE DEVICE TO DETECT
BEARING DEVIATION
Filed Sept. 29, 1961  3 Sheets-Sheet 2
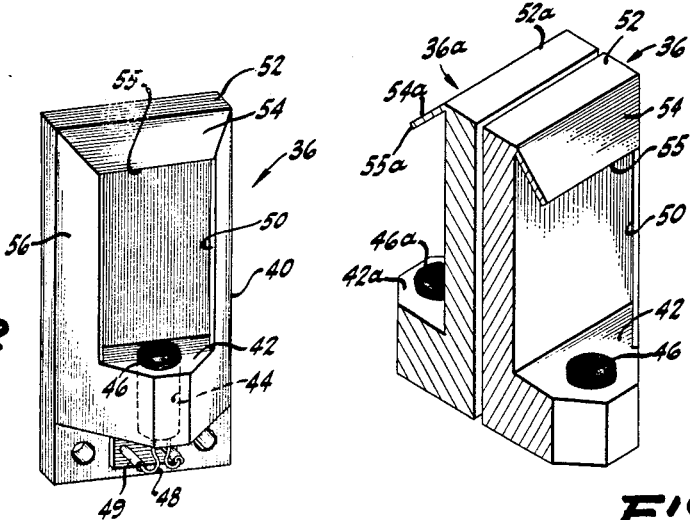
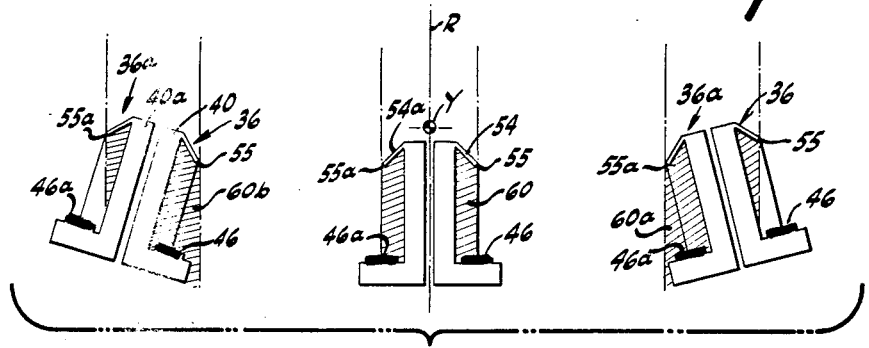
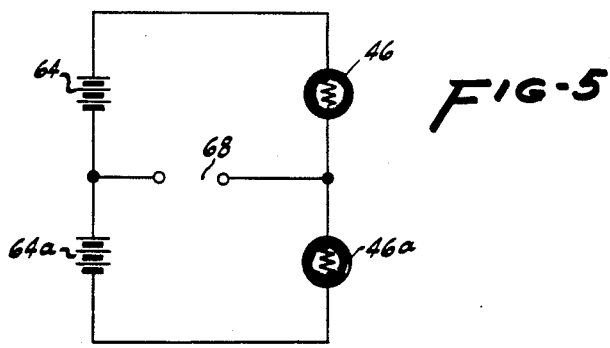
GERALD W. MEISENHOLDER
HOWARD C. VIVIAN
JAMES D. ACORD
LOUIS F. SCHMIDT
INVENTORS
BY
ATTORNEYS

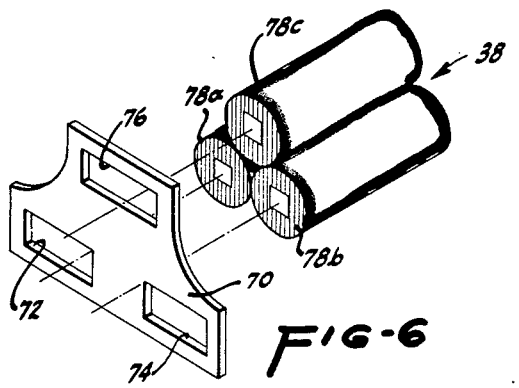
FIG-6
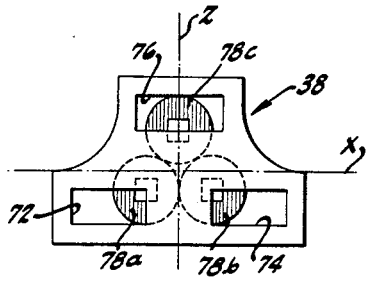
FIG-7
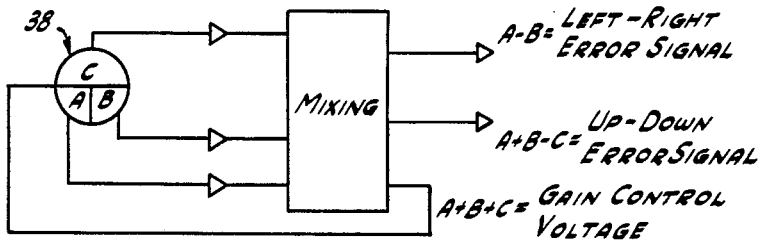
FIG-8
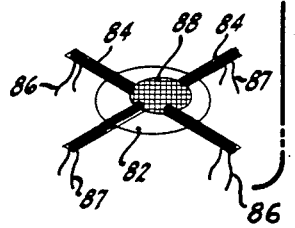
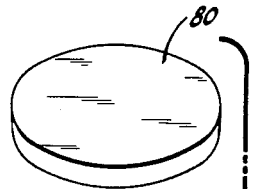
FIG-9

United States Patent Office 3,205,362
Patented Sept. 7, 1965

3,205,362
PHOTOSENSITIVE DEVICE TO DETECT
BEARING DEVIATION
Hugh L. Dryden, deputy administrator of the National Aeronautics and Space Administration, with respect to an invention of Gerald W. Meisenholder, Howard C. Vivian, James D. Acord, and Louis F. Schmidt
Filed Sept. 29, 1961, Ser. No. 180,381
4 Claims. (Cl. 250—203)

This invention relates to sensing devices and, more particularly, to devices for sensing light from a remote source, such as the Sun and/or the Earth in order to detect deviations of a space vehicle from a predetermined reference attitude with respect to such light sourcs.

Particularly in the case of unmanned space vehicles, systems for automatic control of flight attitude are necessary in order to insure adherence to a pre-selected flight pattern and to permit guidance of the vehicle in mid-flight maneuvers. Attitude can be corrected and controlled by the selective direction of thrust or torque means to rotate, or oppose rotation of, the vehicle about the three conventional orthogonal attitude axes. But, it is first necessary to sense or detect the relative disposition of each axis with respect to reference points or lines in order to determine how much correction, if any, is required. Within a reasonable distance range of the Earth, visual or radio signals might be received from widely spaced transmitters on the Earth's surface and translated as lines of reference, but in the case of deep penetration into space the lines of reference to the signal sources become less distinct. Hence, it is desirable to utilize points widely separated in space as the basis for attitude reference lines. Then, imaginary lines drawn from the space vehicle to such remote points might be established in a particular relationship to the three conventional, mutually orthogonal attitude axes in order to fix a reference from which attitude is controlled. A suitable sensing means which is operative to indicate alignment of one of the attitude axes with one of the imaginary reference lines and to detect angular deviation from that alignment would automatically establish a control of flight attitude about two of the three mutually orthogonal axes. Then, if a plane of the aligned axis was established in a specific angular relationship with respect to a line from a second remote point in space complete attitude control would be achieved. The Sun, the Moon, the stars and the Earth are regarded as convenient points in space to be utilized for this purpose, and since they are sources of light the need for light sensitive detecting means is suggested as a means for establishing the lines of reference.

The sensing devices of this invention detect deviations of the bearing to a remote source of light from an established reference bearing by measuring the relative values of an electrical characteristic of photosensitive members, which values vary in accordance with the amount of light the members receive. For example, Sun sensors are directed along the fore and aft roll axis of the vehicle to detect deviations of that axis from a line to the center of the Sun. For this purpose, a mask or shadow vane is disposed relative to two photosensitive members so that if the sensor, and hence the roll axis of the space vehicle itself, is tilted in either direction about one of the other two attitude axes, i.e. the pitch and yaw axes, one photosensitive member will be shaded more than the other and a signal will be generated indicative of an unbalance in the electrical characteristic. The signal may be transmitted to actuate suitable thrust or torque devices for introducing corrective force. As the second remote source of light for stabilization of flight attitude about the roll axis, it is desired to sense the center of light reflected from the Earth and for this purpose a more sensitive device is required. The Earth sensor is preferably mounted on a pivoted arm to swing in a fixed reference plane of the roll axis and is operable to detect deviations about two axes. Specifically, it detects right or left roll deviations of the fixed reference plane in which the arm pivots, and it detects up and down "pitch" deviations with the resultant signals controlling electrical means for moving the swinging arm to keep the Earth sensor pointed toward the Earth.

Other purposes and advantages of this invention will become apparent when the specification following is read in connection with the drawings wherein:

FIG. 2 is an isometric view of a main component of one form of light source sensor made according to this invention;

FIG. 3 is an isometric view partially in section of a complete light sensor using the components of FIG. 2;

FIG. 4 is a schematic illustration of the method of operation of the sensing device of FIG. 3;

FIG. 5 shows an electrical circuit incorporating the sensor of FIG. 3;

FIG. 6 is a schematic isometric view of another type of sensor;

Figure 1:
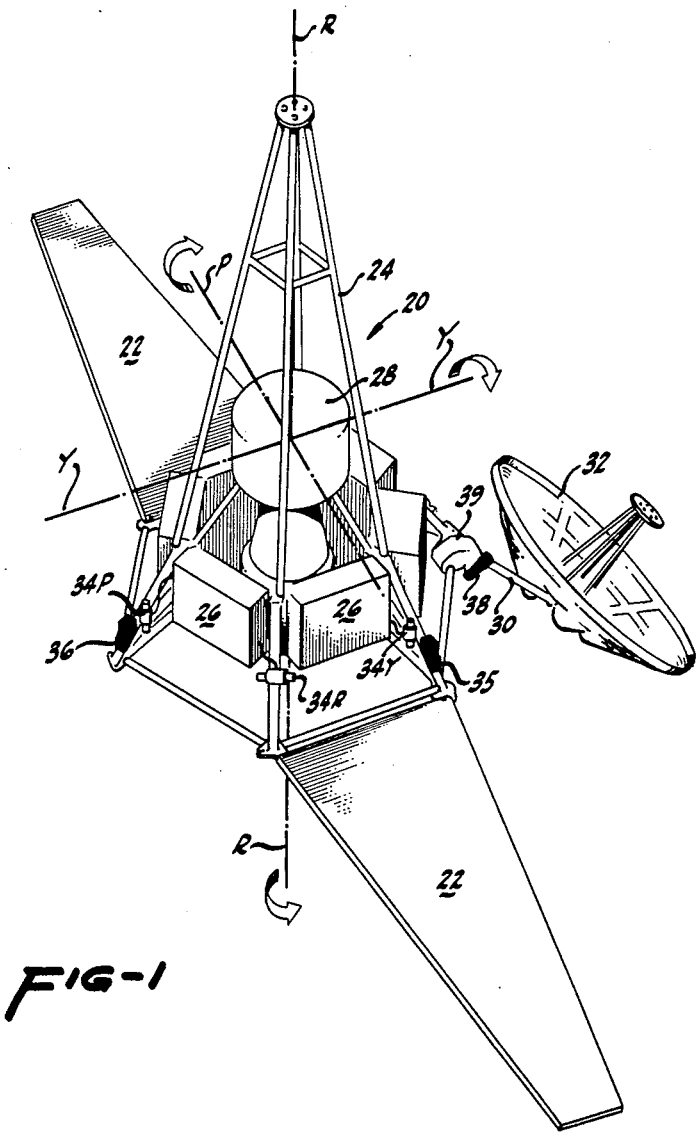
FIG. 1 is an isometric view of a space vehicle embodying features of this invention.

FIGS. 7 and 8 schematically illustrate the method of operation of the sensor of FIG. 6; and FIG. 9 is a schematic illustration of another embodiment of this invention.

Referring now to the drawings, the space vehicle on which the sensing devices of this invention are provided may be of any suitable construction, but there is shown generally in FIG. 1, a space vehicle 20 having solar panels 22 hingedly connected to the vehicle framework 24. The solar panels 22 are extended outwardly after the vehicle is projected into space by any suitable means (not shown) so that during space flight solar cells on the surface thereof may receive and convert the Sun's solar energy into electrical power for operation of devices for guidance, communication, control and scientific experimentation shown generally at 26. Propulsion of the vehicle for mid-flight maneuvers is accomplished by means of a small rocket motor 28 aimed to fire directly back along the roll axis. Also hingedly connected to the vehicle framework 24 is an arm 30 on which is carried a high-gain directional antenna 32.

In FIG. 1 there is schematically shown the three mutually orthogonal attitude axes of the space vehicle 22, the roll axis R, the yaw axis Y and the pitch axis P. Torque may be delivered to the vehicle about these axes in order to achieve, maintain and/or restore the vehicle to a reference attitude positioned with respect to each of the axes by means of any suitable actuators. For purposes of illustration, the actuators here shown include jets 34R for torquing the vehicle about the roll axis and jets 34P and 34Y for providing torque about the pitch and yaw axis respectively.

The actuators are operated in response to signals received from the sensing devices of this invention. Sun sensors 35 and 36 are arranged to detect deviations of the roll axis with respect to a line from the spacecraft to the Sun as will hereinafter be described. Mounted on the swinging arm 30 carrying the directional antenna 32 is the Earth sensor 38 which is adapted to fix the plane through which the swinging arm moves with respect to a line to the Earth for attitude control about the roll axis. Also, for the purpose of saving power or increasing the range of operation, the Earth sensor may actuate a servo motor or the like 39 controlling the arm 30 to keep the antenna 32 pointed directly at the Earth.

Referring now to FIGS. 2 to 4, each component of the

Sun sensor 35, 36 comprises a casing 40 from which is extended a platform or shelf 42. A bore 44 extending completely through the shelf contains a cylindrical photosensitive member 46 so that the circular top surface of the cylindrical member is exposed through the open top of the bore. While the photosensitive member illustrated is of cylindrical configuration, it is to be understood that other configurations may be employed. Any suitable photosensitive member wherein an electrical characteristic is varied in accordance with illumination would be satisfactory for use and for this purpose materials, such as cadmium sulphide, the resistance of which is varied with illumination, have been found to be particularly suitable for use as detectors. Electrical conductors 48 connect the sensing element to the terminals 49 in order to transmit the signal influenced by a change in resistance value.

Above a rectangular recess 50 into which a portion of the detector element 46 extends the top wall 52 of the casing 40 forms a light shield or shade 54 which extends forwardly and downwardly toward the shelf 42 so that light from above will cast a shadow which is sharply defined by the forward edge 55 of the light shield. The forward extend of the shield 54 is such that a projection of the shield on the shelf covers approximately one-half of the photosensitive member. Preferably, similar side shields 56 are provided as lateral extensions of the shield 54.

Referring now to FIG. 4 the method of operation of the Sun sensors is illustrated schematically. The Sun sensor's casings 40, 40a are arranged in pairs, with the forward edge of the light shade 55, 55a disposed parallel to each other and to the attitude axis about which deviation is being sensed. A projection of each shade 54, 54a is defined by the edge of the shadow 60 below the shade when the lines of incidence of the light is normal to the detectors, i.e. parallel to the plane of the shadow vane 62 formed by the back walls. Thus, when the back walls are pointed directly at the Sun both photosensitive members 46, 46a are illuminated equally to the extent of approximately one-half their areas, and the electrical characteristics thereof are balanced. On the other hand, should the sensors be tilted with the vehicles so that they no longer point directly at the Sun, the oblique shadow 60a or 60b cast by the shades 54, 54a does not fall equally upon the two photosensitive members 46, 46a and the electrical characteristics are not in balance.

In the electrical diagram of FIG. 5 the photosensitive devices 46, 46a are connected as resistors in a bridge circuit. Since matched detectors are used, the resistances of the two detectors are equal when the shadow vane 62 points directly toward the Sun and, in this condition, the bridge circuit is balanced so that the direct current sources 64, 64a are in equal opposition and no output is delivered. However, when the shadow vane is tilted in one direction or the other with respect to the incidence lines of the Sun's rays, one photosensitive member 46 or 46a receives more light and the resistances are unbalanced. As a consequence, an appropriate signal is delivered to the output 68 indicative of the amount and the direction of inclination from the desired reference plane. The output of the electrical circuit may be connected to suitable amplification (not shown) for operation of the torque actuators 34, the direction of the torque being dependent upon the strength and polarity of the signal and about the appropriate axis to restore proper attitude control.

Referring again to FIG. 1, each of the matched pair of sensing components is disposed with respect to one of the yaw and pitch attitude axes. For example, each yaw sensing component 35 is pointed along the roll axis R with the forward shadow vane edge 55 disposed parallel to the yaw axis Y so that a deviation in illumination from equality will reflect a tilting of the central shadow vane 62 from a direct line to the Sun. Similarly, differences in illumination of the photosensitive members in matched sensor component 38 reflect an angular deviation of the roll axis R about the pitch axis P. It is to be noted that the casings 40 of matched pairs of sensing devices may be mounted directly back to back or they may be mounted on different parts of the vehicle frame 24. It is only necessary that they be disposed in the proper relationship to the vehicle's attitude axes.

Referring now to FIGS. 6 to 8, there is illustrated the Earth sensor 38, the function of which is similar to that of the Sun sensor although it must be more sensitive in order to detect the lesser amount of energy radiated thereby. The Earth sensor comprises first, a mask or shield 70 having a pair of windows 72 and 74 spaced laterally and a third opening 76 spaced vertically from the first pair. A photomultiplier tube 78a, 78b and 78c is mounted behind each of the openings or windows so that each receives light in a predetermined pattern. The two lower windows and the photomultiplier tubes behind them are arranged so that when the line of incidence of light passing against the mask is normal to the horizontal axis X of the lower windows the lower photomultiplier tubes each receives an equal quantity of light. Since all of the photomultiplier tubes are matched, the outputs of the two lower tubes are equal in this condition indicating adherence to the reference attitude. When the lower photomultiplier tubes are in balance, the plane in which the antenna arm pivots includes the reference line from the center of the Earth's reflected light to the vehicle.

The third opening is arranged with its photomultiplier tube 78c so that when the line of incidence of the Earth's reflected rays is normal to the vertical axis Z the illuminated portion of the sensitive member of the upper photosensitive tube is equal to the illuminated areas of the two lower photomultiplier tubes. Conveniently, the lower windows are designed to expose one-quarter of the lower photomultiplier tubes and the upper window to expose one-half of the upper photomultiplier tube when the desired reference attitude is achieved about both axes. If the output signals from the three photomultiplier tubes are designated as A, B and C, then the algebraic difference $A-B$ will give the required error signal for the X axis and $A+B-C$ will give the required error signal for the Z axis. The sum signal, $A+B+C$, is applied in a closed control loop to adjust the excitation voltage for the photomultiplier tubes so that the differential sensing signals will not vary appreciably with the amount of light being received, i.e. the distance from the Earth. Preferably, the windows are of sufficient size that the Earth sensor has a 40° x 60° field of view, but as the vehicle moves through just a small arc out of the reference attitude, in the order of 2½° in either direction, the system is designed to saturated and hold its output for the remainder of the field of view.

When the error signal for the upper axis, $A+B-C$ is out of balance, a signal is delivered to a suitable servo motor shown generally at 39 to raise or lower the antenna arm 30 and direct the antenna 32 at the center of the Earth's reflected light.

Referring now to FIG. 9 there is shown still another embodiment of this invention involving the use of optical means for concentrating the energy from a source of light. Such a device could include a suitable lens 80 which focuses an image 82 of the Sun or other light source in a sharply defined form, preferably circular on an assembly of four narrow, elongate photosensitive members 84 radiating outward of the circular image in diametrically opposed pairs spaced 90° from each other. Conductors 86 and 87 connect the opposed pairs of photosensitive strips together in a bridge circuit of the type shown in FIG. 5 so that the output thereof will indicate their position with respect to the lines of incidence of the source of light. Preferably, the axes of the two pairs of photosensitive members coincide with two attitude axes of the vehicle 20 so that the third, mutual orthogonal axes will be precisely aligned with the line to the source of light when the photosensitive strips are in perfect balance.

If they are not exactly aligned, i.e. the vehicle has strayed from its reference attitude, the area of the opposing pairs of strips illuminated by the Sun image will be unequal and the resultant differences in voltage can be used to realign and restore the attitude of the vehicle.

Preferably, the sensitivity of this aligning means is increasing by spacing the strips outward of the center of the image so that only the edge of the image will strike the photocells and a given degree of misalignment of the vehicle will result in a great percentage change in the output of each photocell. This may be accomplished by occulting the Sun image with a mask 88 which is slightly smaller in diameter than the light image 82.

It is apparent that further modification and variations of this invention herein disclosed may be may be made without departing from the spirit and scope of the teachings herein and that the invention is to be delineated by the claims appended hereto.

What is claimed is:

1. A sensing device for indicating deviation of a body from a predetermined attitude with respect to a remote source of light comprising;
    a pair of photosensitive members on said body spaced along a first axis thereof,
    a third photosensitive member on said body spaced from said first axis along a second axis normal thereto,
    said photosensitive members having an electrical characteristic which varies equally in accordance with the illumination thereof,
    an opaque mask positioned adjacent said photosensitive members for restricting the amount of light to pass said remote source against said photosensitive members,
    said mask being conditioned to permit equal illumination of said pair of photosensitive members when said first axis is normal to the line from said remote source and to illuminate said third photosensitive member over an area equal to the total area illuminated by said pair of said photosensitive members when said second axis is normal to a line from said remote source,
    first circuit means for transmitting a signal indicative of a comparison between the values of the electrical characteristic of said pair of photosensitive members, and
    second circuit means for transmitting a signal indicative of a comparison of the value of the electrical characteristic of the third photosensitive member to the sum of the values of the electrical characteristic of said pair of photosensitive members.

2. The sensing device for indicating deviation of a body from a predetermined attitude with respect to a remote source of light comprising;
    a pair of photomultiplier tubes having the light sensitive members thereof spaced along a first axis,
    a third photomultiplier tube on said body having its light sensitive member spaced from said first axis along a second axis normal thereto,
    a light shield means disposed between said photomultiplier tubes and said remote light source conditioned to pass light so that the signal produced by said pair of photomultiplier tubes is equal when the lines of incidence of light from said remote source are normal to said first axis and the signal delivered by said third photosensitive tube is equal to the sum of the signals of said pair of photomultiplier tubes when said second axis is normal to said lines of incidence.

3. A sensing device for indicating deviation of a body from a predetermined attitude with respect to a remote source of light comprising;
    a light mask on said body having a pair of openings spaced along a first axis to permit passage of light from said remote source,
    a pair of spaced photosensitive members on said body each having an electrical characteristic which varies in accordance with the illumination thereof,
    electrical means in circuit with said photosensitive members for transmitting a signal indicating in which of said members the value of the electrical characteristic is the greater,
    said pair of photosensitive members being aligned with said pair of openings so that when a line from said body to said remote source of light is normal to the plane of said mask the value of the electrical characteristic in both of said pair of members is equal,
    a third opening in said mask spaced at right angles to said first axis, and
    a third photosensitive member on said body aligned with said third opening so that when said line is normal to said mask the value of the electrical characteristic of the third photosensitive member is equal to the sum of the values of the electrical characteristics of said first and second photosensitive members together.

4. A sensing device for detecting the deviation of a body about a pair of axes from a predetermined attitude with respect to a remote light source comprising:
    a pair of photosensitive members on said body spaced along a first axis and each member having an electrical characteristic which varies in accordance with the illumination thereof by said light source,
    a third photosensitive member on said body spaced from said first axis along a second axis normal thereto and having an electrical characteristic which varies in accordance with illumination thereof by said light source,
    a light mask fixed on said body and interposed between said members and said light source,
    a pair of spaced apart openings in said light mask and aligned with said pair of photosensitive members, and
    a third opening in said light mask spaced from said pair of openings and aligned with said third photosensitive member,
    a first circuit means for transmitting a single signal indicative of a comparison between the values of the electrical characteristics of said pair of photosensitive members upon movement of said body about said second axis, and
    a second circuit means for transmitting a signal indicative of a comparison of the value of the electrical characteristics of said third photosensitive member to the sum of the values of the electrical characteristics of said pair of photosensitive members upon movement of said body about said first axis.

References Cited by the Examiner

UNITED STATES PATENTS

| | | | |
|---|---|---|---|
| 2,155,402 | 4/39 | Clark | 250—203 X |
| 2,828,930 | 4/58 | Herbold | 250—203 X |
| 2,898,800 | 8/59 | Bergson | 250—43.5 |
| 2,967,249 | 1/61 | Quirk | 250—215 |
| 2,994,780 | 8/61 | Wilcox | 250—203 |
| 3,028,500 | 4/62 | Wallmark | 250—203 X |
| 3,050,631 | 8/62 | Bourguignon | 250—203 |
| 3,087,373 | 4/63 | Poor et al. | 250—203 X |
| 3,098,934 | 7/63 | Wilson et al. | 250—203 |

FOREIGN PATENTS 118,539    10/57    Russia.

RALPH G. NILSON, *Primary Examiner.*

ARCHIE BORCHELT, *Examiner.*